(12) United States Patent
Stenzel et al.

(10) Patent No.: US 11,044,164 B2
(45) Date of Patent: Jun. 22, 2021

(54) ACTUATOR

(71) Applicant: AUMA Riester GmbH & Co. KG, Mullheim (DE)

(72) Inventors: Rudiger Stenzel, Hilchenbach (DE); Andreas Ortlieb, Staufen (DE)

(73) Assignee: AUMA Riester GmbH & Co. KG, Müllheim (DE)

(*) Notice: Subject to any disclaimer, the term of this patent is extended or adjusted under 35 U.S.C. 154(b) by 0 days.

(21) Appl. No.: 16/502,702

(22) Filed: Jul. 3, 2019

(65) Prior Publication Data

US 2020/0014601 A1    Jan. 9, 2020

(30) Foreign Application Priority Data

Jul. 5, 2018 (DE) .................. 102018116339.8

(51) Int. Cl.
*H04L 12/24* (2006.01)
*H04W 84/18* (2009.01)

(52) U.S. Cl.
CPC ............. *H04L 41/12* (2013.01); *H04W 84/18* (2013.01)

(58) Field of Classification Search
CPC ............... H04L 41/12; H04L 29/08306; H04L 29/08567; H04L 43/0811; H04L 45/02; H04L 45/026; H04L 45/12; H04L 45/121; H04L 45/54; H04W 84/18; G06F 11/1446
See application file for complete search history.

(56) References Cited

U.S. PATENT DOCUMENTS

| | | | |
|---|---|---|---|
| 8,526,935 B2 * | 9/2013 | Besore | H01Q 1/007 455/420 |
| 2016/0088424 A1 | 3/2016 | Polo et al. | |
| 2018/0124550 A1 | 5/2018 | Kwon et al. | |
| 2019/0100961 A1 * | 4/2019 | Kutell | E06B 9/50 |
| 2019/0309562 A1 * | 10/2019 | Hall | E05F 15/71 |

* cited by examiner

*Primary Examiner* — Thomas R Cairns
(74) *Attorney, Agent, or Firm* — Volpe Koenig

(57) ABSTRACT

An actuator (4), having a communication unit (7) to set up a first radio link (6) to receive and transmit messages, and having a processing unit (9) to process messages. The actuator (4) is configured to process received messages in the processing unit (9) and to forward them via a second radio link (6). The actuator (4) is incorporated as a network node into a mesh network (1) and an optimum transmission path (32) between the network nodes is first determined for the transmission of messages.

13 Claims, 4 Drawing Sheets

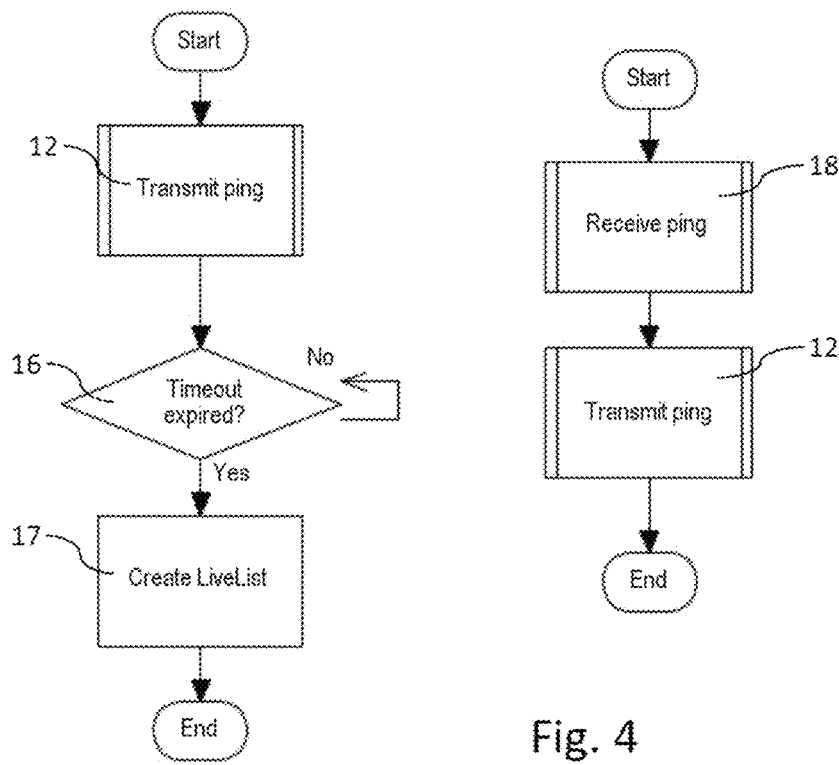
Fig. 3
Fig. 4
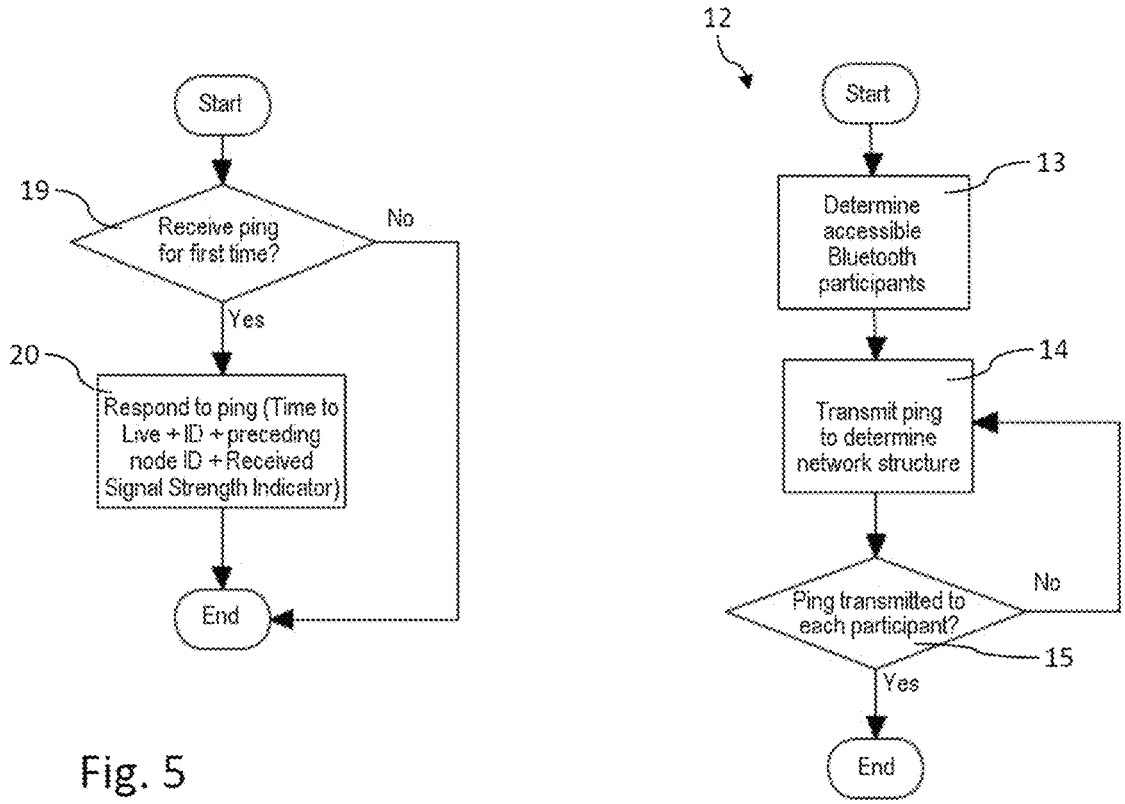
Fig. 5
Fig. 6

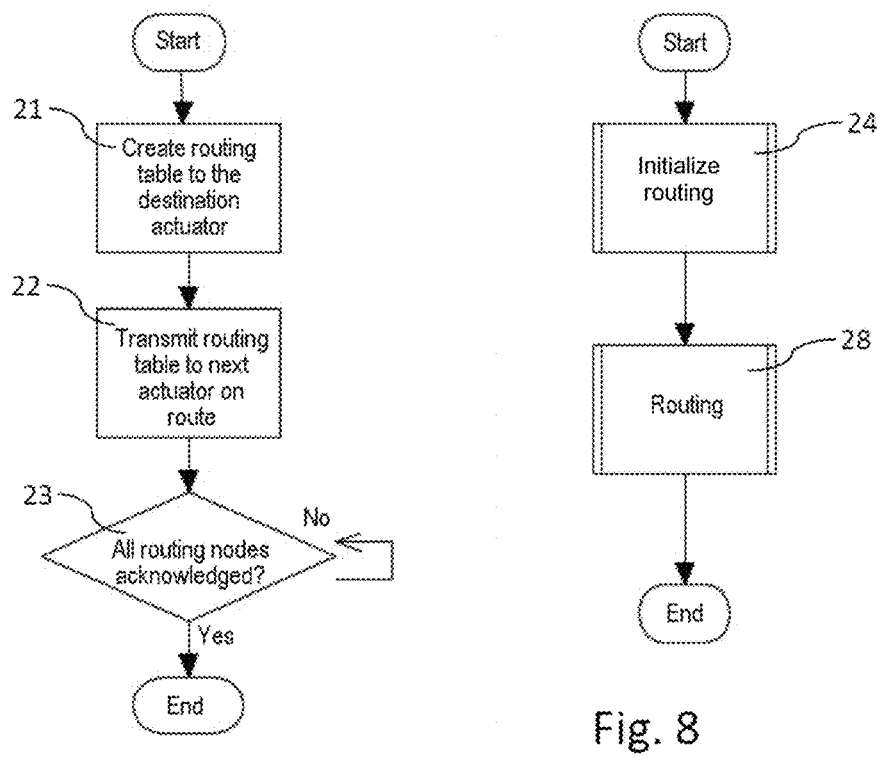
Fig. 7
Fig. 8
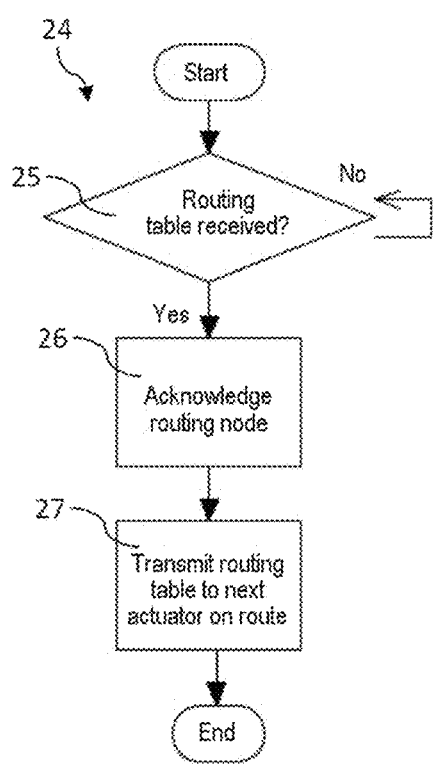
Fig. 9
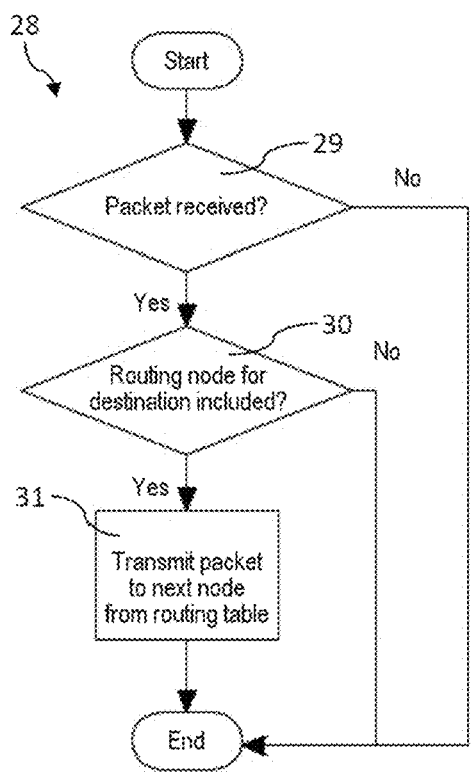
Fig. 10

ACTUATOR

INCORPORATION BY REFERENCE

The following documents are incorporated herein by reference as if fully set forth: German Patent Application No. 10 2018 116 339.8, filed Jul. 5, 2018.

BACKGROUND

The invention relates to an actuator, having a communication unit to set up a first radio link to receive and transmit messages, and having a processing unit to process messages.

Actuators normally have a service interface via which a configuration or fault diagnosis is possible. The service interface can be implemented by means of a wired connection or via a radio link.

It is conventional in the prior art to implement the service interface via a WLAN or Bluetooth radio link. The disadvantage therein lies in the short range of the radio signals. In order to configure an actuator, the technician must therefore come into the radio range of said actuator.

SUMMARY

The object of the invention is therefore to provide an actuator whose service interface is usable over a longer distance.

This object is achieved by an actuator with one or more features according to the invention. The object is furthermore achieved by a method with one or more features according to the invention.

The actuator according to the invention is configured, in particular, to process received messages in the processing unit and/or to forward them via a second radio link so that the actuator is usable as a network node, for example can be incorporated into a mesh network. A mesh network can be characterized, for example, in that each network node is connected or connectable to one or more other network nodes. The information can thus be forwarded from network node to network node until it reaches a destination.

The actuator according to the invention can accordingly form a mesh network with further actuators, wherein each actuator is connected or connectable via a radio link to at least one further actuator. Each actuator is ideally connected to all actuators located within range.

The advantage in the case of the actuator according to the invention is that a received message can now be forwarded via a second radio link. A message can thus be forwarded via a plurality of actuators through to its actual recipient. Each actuator in the mesh network thus increases the range of the radio link.

Particularly in installations with very many actuators, a complete accessibility of every location within the mesh network can thus be achieved.

A configuration or fault diagnosis is therefore readily possible from a central location, as a result of which the time requirement is substantially reducible.

Depending on the content or designation in the processing unit of the actuator, a message received on an actuator can thus be used, for example, to control an actuating system or can be forwarded to a further actuator. For the evaluation of received messages, the actuator can thus be configured in such a way as to determine whether said messages are to be processed or forwarded.

In one advantageous design, the radio links are designed as Bluetooth connections. Bluetooth is established as a transmission system in the prior art and is simply implementable. It can additionally be designed as highly energy-efficient.

Here, a network node is any device which is incorporated into the mesh network. Control units, for example computers or tablets, can be incorporated as network nodes along with the actuators. Is also possible that not all network nodes are designed to forward messages. One control unit can thus be a terminal node.

For the effective communication within the mesh network, it is appropriate if a topology of the mesh network is determinable on a network node, in particular a control unit, in particular through runtime measurement. The topology contains the information indicating which network nodes are interconnected and possibly the distances between the network nodes. The topology can be distributed by the control unit to each network node so that the information is available locally and does not always have to be redetermined.

In order to save energy, it is appropriate if the actuator has an idle mode which can be ended via the mesh network by way of a wake-up message. The communication unit can be activated, preferably periodically, in the idle mode. An idle mode of this type can be advantageous, particularly in the case of autonomous actuators which have no central power supply. An actuator of this type can be operated, for example, via solar cells, accumulators or a long-lasting battery.

The actuator can have at least one antenna in order to set up the radio link. This antenna can be integrated into the actuator. However, it is particularly appropriate if the antenna is disposed outside a housing of the actuator. The screening effect of a housing, particularly if it consists of metal, is thereby avoided. The range of the radio link thus increases significantly. The antenna can also be disposed at a favorable position separate from the housing in order to further increase the range. However, it is particularly appropriate if the antenna is disposed in a plastic insert on the housing. In this way, the antenna is protected against environmental influences and the plastic shortens the range to a negligible extent only.

In one design of the invention, the actuator has a network address which is unique, at least in the respective mesh network. A message is thus transmittable in a targeted manner to an actuator in the mesh network. An address of this type may, for example, be an IPv6 address.

The actuator can, in principle, forward any message which it receives. However, this can result in increased network traffic and can therefore cause a delay in the communication.

It is particularly appropriate if the actuator has two operating modes, i.e. a forwarding mode and a receiving mode.

Messages are forwarded directly in the forwarding mode. No processing takes place here.

A message is transferred to the processing unit in the receiving mode. No forwarding normally takes place here. As a result, the actual recipient of a message does not forward this message and no additional and unnecessary network traffic therefore occurs.

The operating mode is appropriately chosen on the basis of the network address. An actuator can, in principle, be operated in the forwarding mode. As soon as the actuator recognizes on the basis of the address that it is the recipient, it can switch to the receiving mode.

In one design of the invention, the processing unit is disconnected from the communication unit and possibly from the energy supply in the forwarding mode. The processing unit is accordingly activated and connected to the communication unit only in the receiving mode. Energy can additionally be saved in this way.

The invention also comprises a method for operating an actuator as a network node in a wireless mesh network. In particular, according to the invention, messages received via a first radio link are processed in the actuator or are forwarded via a second radio link to at least one further network node.

In this way, each actuator in the network can either serve as a recipient of a message or as a relay in order to increase the range of a radio link.

Actuators which allow no direct radio link, for example due to their distance, can therefore also be accessed through the forwarding of messages.

It can be particularly appropriate if a topology of the mesh network is determined by a network node, in particular a control unit, in particular through runtime measurement of messages. Finally, the topology contains the information indicating which network nodes are interconnected.

The topology can be defined, in particular, through automatic or on-demand determination of runtimes for the transmission of messages and/or transmission ranges between individual network nodes. The topology can be determined, for example, periodically or when a network node is added.

The topology of the network is important, in particular, for the routing of messages. A message to a specific network node can be sent, for example, as a broadcast to all accessible network nodes. All network nodes which are not recipients then forward this message again to all network nodes which are in turn accessible. In this way, each message is distributed multiple times unnecessarily and redundantly in the mesh network.

In one particularly advantageous design, an optimum transmission path is therefore first determined in each case before the transmission of messages between two network nodes, in particular from the determined runtimes and/or transmission ranges. In other words, the optimum transmission path can be determined from the topology.

For this purpose, for example, the recipient is first searched for in the topology and said recipient is connected in reverse to the sender of the message. An optimum path for the message can be determined in this way. The message can then be transmitted in a targeted manner to the network node which follows on the path to the sender. Since the latter is not the recipient, it forwards the message, wherein the optimum path is again determined here in the same way. A message can thus be transmitted quickly and in a targeted manner without unnecessary network traffic.

Alternatively, the optimum transmission path, in particular all intermediate stations, can be transmitted with the message, so that each network node can infer the next recipient from the received transmission path. A very fast and direct forwarding of the message is possible in this way.

BRIEF DESCRIPTION OF THE DRAWINGS

The invention is explained in detail below on the basis of example embodiments with reference to the attached drawings.

In the drawings:

FIG. 3 shows a flow diagram for the recording of the topology by a control unit, FIG. 4 shows a flow diagram for the recording of the topology by an actuator, FIG. 5 shows a flow diagram for the transmission of a ping message, FIG. 6 shows a flow diagram for the reception of a ping message, FIG. 7 shows a flow diagram for the determination of the optimum transmission path by a control unit, FIG. 8 shows a flow diagram for the determination of the optimum transmission path by an actuator, FIG. 9 shows a flow diagram for the routing device, FIG. 10 shows a flow diagram for the performance of the routing.

DETAILED DESCRIPTION

Figure 1:
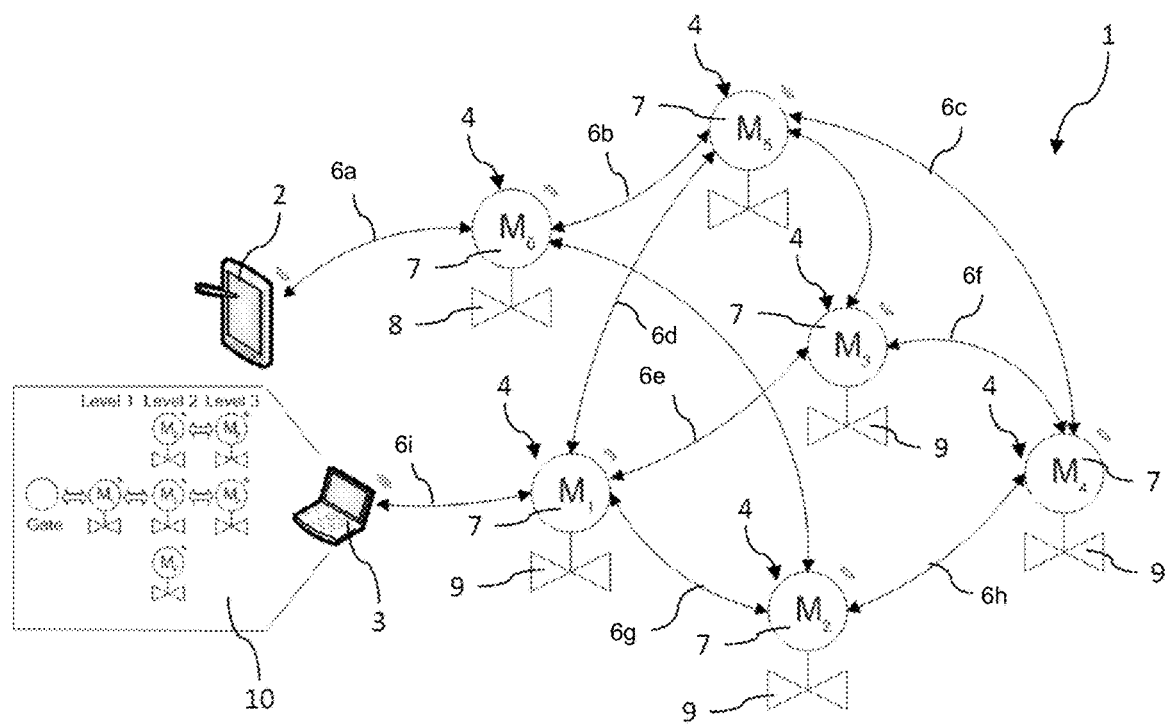
FIG. 1 shows a mesh network with a plurality of actuators according to the invention and two control units in operation.

FIG. 1 shows a mesh network 1 with a tablet 2 and a computer 3 as control units and six actuators 4, separately designated as M1 to M6, according to the invention.

The tablet 2, computer 3, and actuators 4 form network nodes within the mesh network 1. The mesh network 1 is based on radio links 6a-6i between the individual network nodes.

Here, the tablet 2 and the computer 3 are terminal nodes which are connected in each case via a radio link 6a, 6i in each case to only one actuator 4. Conversely, the actuators 4 are connected in each case via a radio link 6b-6h in each case to a plurality of actuators 4.

The actuator 4 has a communication unit 7 having at least one antenna 8 to set up the radio links 6a-6i. The antenna 8 is preferably disposed outside a housing of the actuator 4 so that the radio link 6a, 6b is not attenuated or impaired by the possible screening characteristic of the housing.

The actuator furthermore has a processing unit 9 which is connected to the communication unit 7. An actuating system which is driven via an electric motor can be associated with the processing unit 9.

In the example shown, a topology of the mesh network 1 is defined by the mesh network 1 on a regular basis or on demand, for example when network nodes are added or removed. In the example, this takes place on the computer 3 which is connected as a control unit to the mesh network 1.

The topology 10 contains a list of all network nodes available in the mesh network 1 and their interconnections. In addition, further information may also be contained therein, such as, for example, distances between the network nodes or signal strengths. The topology 10 can also comprise a visual representation of the mesh network 1, so that an installation is completely determinable and manageable on a control unit or even on each actuator 4.

For the configuration or fault diagnosis of an actuator 4, an actuator 4 can be selected, for example, from this visualization or from the topology 10. This can be done, for example, graphically.

Figure 2:
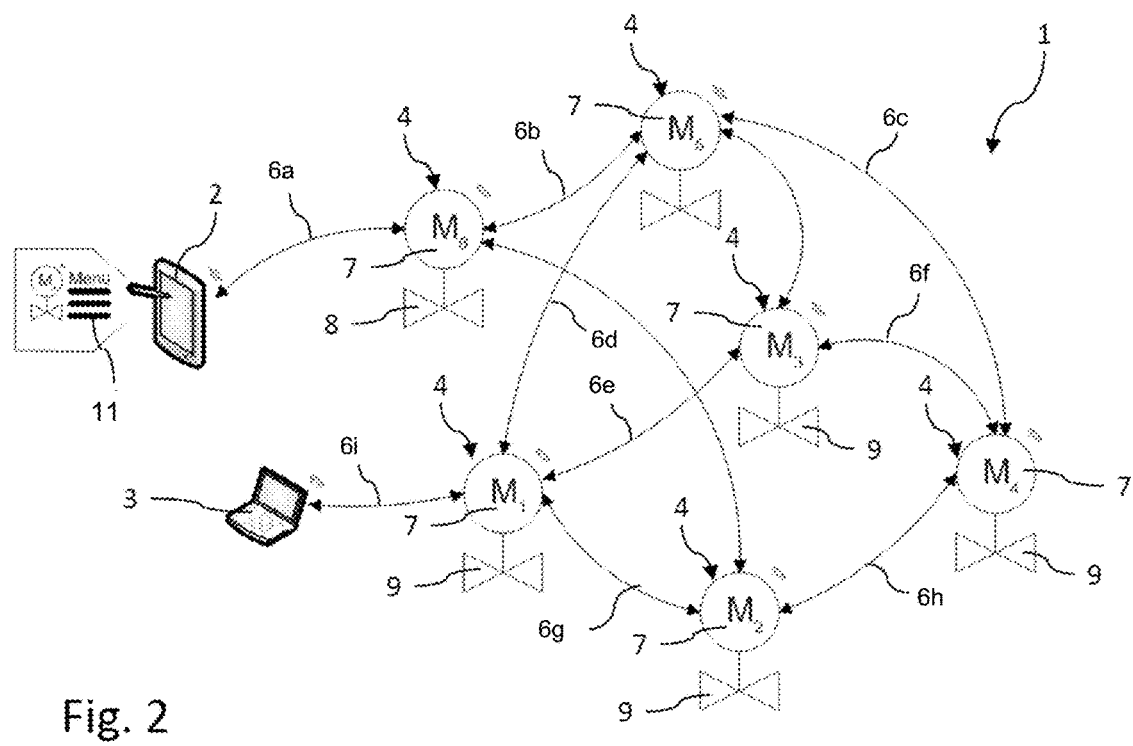
FIG. 2 shows a mesh network with a plurality of actuators according to the invention and two control units in the recording of the topology.

FIG. 2 shows a tablet 2 which is connected to the mesh network 1 as a further control unit. The actuator M4 is selected here by way of example on the tablet 2. This can obviously also be carried out on the computer 3.

Following the selection of an actuator 4, a menu 11 opens displaying the functions of the selected actuator M4 via which, for example, configuration settings or a fault diagnosis are performable.

FIG. 3 describes in a flow diagram the creation of the topology 10 from a control unit. The control unit transmits a ping message 12 into the mesh network 1 for this purpose.

The ping message 12 is transmitted according to the flow diagram shown in FIG. 6. Here, it is first determined 13 which network nodes are accessible via a radio link 6, in the example Bluetooth. This is simply performable using the Bluetooth protocol. A ping message is then transmitted 14 to the first of the accessible network nodes. A check is then carried out to determine whether the transmission has taken place 15 to all accessible network nodes. If not, the process continues with the next accessible network node. If so, the transmission ends.

In the flow diagram shown in FIG. 3, a certain waiting time is waited 16 following the transmission of the ping messages. The topology 10 of the mesh network 1 can then be created 17.

A network node in the mesh network 1 responds to the ping message according to the flow diagram shown in FIG. 4. A ping message is first received 18. This is carried out according to the flow diagram shown in FIG. 5.

Here, a check is first carried out 19 to determine whether the network node receives a ping message for the first time. Since each network node is connected in principle via radio links 6 to a plurality of other network nodes, a response to a ping message takes place once only.

If so, a response is transmitted 20, containing at least one unique address (ID) of the network node, a response time (TTL), the ID of the preceding network node, i.e. the network node from which the ping has been received, and a received signal strength (RSSI). This response finally reaches the control unit which creates the topology 10 of the mesh network 1 therefrom.

A ping message 12 is then transmitted by this network node, according to flow diagram shown in FIG. 6.

In this way, it is ensured that each network node in the mesh network 1 receives at least one ping message and responds thereto. The control unit thus receives a response from each network node so that a complete topology 10 can be created. On the basis of the details of each network node transmitted in the response relating to the signal strength and possibly to the signal runtime, the topology can comprise a spatial representation of the network nodes as well as an inventory list.

In order to transmit a message within the mesh network 1 in a targeted manner to a network node, the optimum transmission path is determined according to the invention before each transmission procedure. This optimum transmission path can be characterized, for example, by the fewest intermediate stations, the shortest signal path, the overall lowest transmission power or any combination of these or other features.

In the example, the optimum transmission path is characterized by the fewest intermediate stations, wherein a shorter signal path is prioritized here.

A message is transmitted according to the flow diagram shown in FIG. 7. A routing table containing the optimum transmission path is first created on the basis of the topology 10 available in the mesh network 1. All network nodes are listed therein in sequence as intermediate stations.

This routing table is transmitted 22 to the first network node of the routing table. Finally, a check is carried out to determine whether all network nodes have transmitted 23 an acknowledgement. If not, one of the network nodes on the transmission path cannot forward any messages. A new transmission path can then be found and checked.

The network node which receives a routing table follows the steps according to the flow diagram shown in FIG. 8. The routing is first initialized 24, according to the flow diagram shown in FIG. 9.

A check is carried out to determine whether a valid routing table has been received 25. If so, an acknowledgement is transmitted 26 to the sender network node and the routing table is then transmitted 27 to the next network node in the routing table.

In this way, all network nodes receive the routing table on the optimum transmission path and acknowledge to the initiator that they have received it. In this way, the sender of the message knows that the transmission path is complete and the message cannot be lost in transit.

The message can then be transmitted 28, according to the flow diagram shown in FIG. 10. Here, a check is first carried out 29 to determine whether a message has arrived. A further check is carried out 30 to determine whether the routing table for the destination is contained in the message.

If both are present, the message is forwarded to the next network node listed in the routing table.

Figure 11:
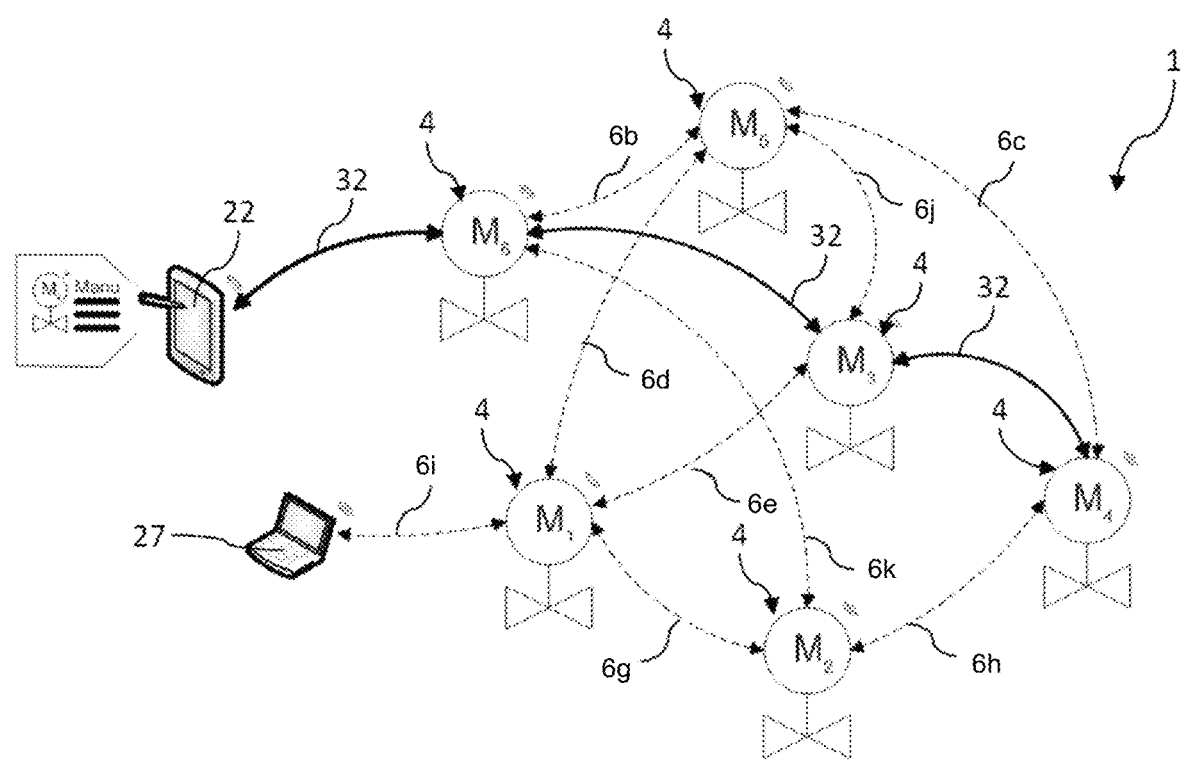
FIG. 11 shows a mesh network with an optimum transmission path.

FIG. 11 shows by way of example a transmission of this type of a message on an optimum transmission path 32. In the example, a configuration message is intended to be transmitted from the tablet 2 to the actuator M4. The optimum transmission path is defined on the basis of the topology 10 and the aforementioned criteria and contains the actuators M6, M3 and M4 in this sequence. Only present and possible radio links 6b-6e, 6g-6k, shown as dotted lines, are taken into account.

The transmission paths of M6, M2, M4 and M6, M5, M4 in each case contain only two intermediate stations, but the distances are greater here, so that the aforementioned transmission path is prioritized.

REFERENCE NUMBER LIST

1 Mesh network
2 Tablet
3 Computer
4 Actuator
6a-6k Radio links
7 Communication unit
8 Antenna
9 Processing unit
10 Topology
11 Menu
12 Transmit ping message
13 Determine accessible participants
14 Transmit ping message
15 Ping message transmitted to all?
16 Wait
17 Create topology
18 Receive ping message
19 Receive ping message for the first time?
20 Transmit response
21 Create routing table
22 Transmit routing table
23 All intermediate stations acknowledged?
24 Initialize routing
25 Routing table received?
26 Transmit response as acknowledgement
27 Forward routing table
28 Routing 29 Message received?
30 Routing table included?
31 Forward message
32 Optimum transmission path

The invention claimed is:

1. An actuator (4), comprising:
 a communication unit (7) configured to set up a first radio link (6) to receive and transmit messages,
 a processing unit (9) to process messages,
wherein the actuator (4) is configured to at least one of process received messages in the processing unit (9) or to forward the received messages via a second radio link (6a-6k), such that the actuator (4) is a network node adapted for incorporation into a mesh network (1),
 the actuator (4) is further configured with two operating modes, including a forwarding mode in which received messages are forwarded, and a receiving mode in which received messages are processed in the processing unit (9), and
 the processing unit (9) is disconnected from the communication unit (7) and an energy supply in the forwarding mode.

2. The actuator (4) as claimed in claim 1, characterized in that the first and second radio links (6a-6k) are Bluetooth connections.

3. A system including the actuator of claim 1, and further comprising a control unit (2, 3) as a further network node configured to determine a topology (10) of the mesh network (1).

4. The actuator (4) as claimed in claim 1, wherein the actuator is configured with an idle mode which adapted to be ended via the mesh network via a wake-up message.

5. The actuator (4) as claimed in claim 1, further comprising at least one antenna (8) disposed outside a housing of the actuator (4).

6. The actuator (4) as claimed in claim 5, wherein the at least one antenna is located in a plastic insert on the housing.

7. The actuator (4) as claimed in claim 1, wherein the actuator (4) has a network address (ID) which is unique, at least in the respective mesh network (1).

8. A method for operating an actuator (4) according to claim 1 as a network node in a wireless mesh network (1), the method comprising:
 processing at least some of the messages received via the first radio link (6) in the actuator (4) in a processing mode,
 forwarding at least some of the messages to at least one further network node via the second radio link (6-6k) in the forwarding mode, and
 disconnecting the processing unit (9) from the communication unit (7) and an energy supply in the forwarding mode.

9. The method as claimed in claim 8, further comprising determining a topology (10) of the mesh network (1) by a control unit that forms a further network node.

10. The method as claimed in claim 9, further comprising determining runtimes for a transmission of messages or transmission ranges between individual network nodes automatically.

11. The method as claimed in claim 9, further comprising determining runtimes for a transmission of messages or transmission ranges between individual network nodes on demand.

12. The method as claimed in 8, further comprising first determining an optimum transmission path (32) in each case for a transmission of messages between two network nodes.

13. The method as claimed in 12, wherein the determining of the optimum transmission path (32) is carried out using at least one of runtimes or transmission ranges.

* * * * *